United States Patent
Watanabe

(10) Patent No.: US 7,813,530 B2
(45) Date of Patent: Oct. 12, 2010

(54) MOTION DETECTING METHOD AND APPARATUS

(75) Inventor: Seigo Watanabe, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 874 days.

(21) Appl. No.: 11/726,285

(22) Filed: Mar. 21, 2007

(65) Prior Publication Data

US 2007/0230785 A1 Oct. 4, 2007

(30) Foreign Application Priority Data

Mar. 22, 2006 (JP) .............................. 2006-078482

(51) Int. Cl.
*G06K 9/00* (2006.01)
(52) U.S. Cl. ..................................................... 382/107
(58) Field of Classification Search ................ 382/107, 382/190, 192, 194, 221; 348/148; 396/153
See application file for complete search history.

(56) References Cited

U.S. PATENT DOCUMENTS

| | | | |
|---|---|---|---|
| 6,477,260 B1 * | 11/2002 | Shimomura | 382/106 |
| 6,590,521 B1 * | 7/2003 | Saka et al. | 342/70 |
| 6,856,696 B1 * | 2/2005 | Ajioka | 382/173 |
| 7,038,577 B2 * | 5/2006 | Pawlicki et al. | 340/435 |
| 7,262,710 B2 * | 8/2007 | Watanabe et al. | 340/903 |
| 7,403,669 B2 * | 7/2008 | Aoyama | 382/281 |
| 7,602,946 B2 * | 10/2009 | Watanabe | 382/107 |
| 2004/0001632 A1 * | 1/2004 | Adachi | 382/224 |
| 2004/0057600 A1 * | 3/2004 | Niwa | 382/103 |
| 2006/0126899 A1 * | 6/2006 | Nagaoka et al. | 382/103 |

FOREIGN PATENT DOCUMENTS

| | | |
|---|---|---|
| JP | 2003-067752 | 3/2003 |
| JP | 2005-209155 | 8/2005 |

* cited by examiner

*Primary Examiner*—Matthew C Bella
*Assistant Examiner*—Shervin Nakhjavan
(74) *Attorney, Agent, or Firm*—Young Basile

(57) ABSTRACT

A motion detection apparatuses and method where a characteristic region is extracted from an image produced by an imaging device are described. A modified region is formed by modifying the characteristic region. Voting occurs so as to count up to increase a count value at a memory address corresponding to a location inside the modified region and to reset a count value at a memory address corresponding to a location outside the modified region. At least one of the moving direction and the moving speed of the modified region is calculated based on a difference among accumulated count values for adjacent locations. The position of the modified region can be calculated based on count values and locations in the modified region.

21 Claims, 9 Drawing Sheets

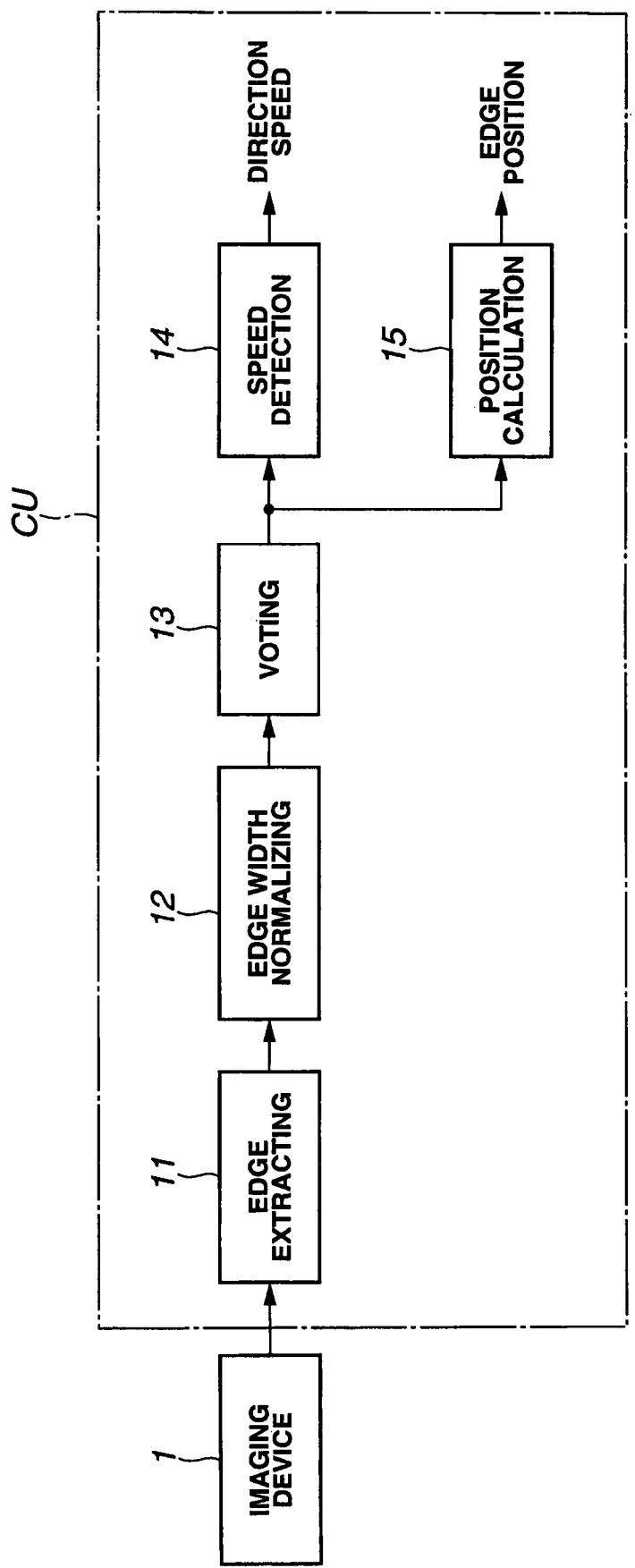

BINARIZATION

THINNING

DILATION

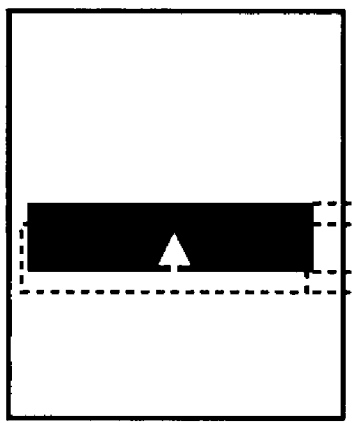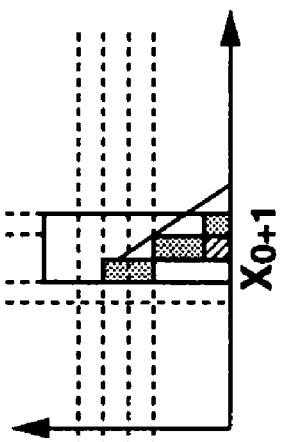
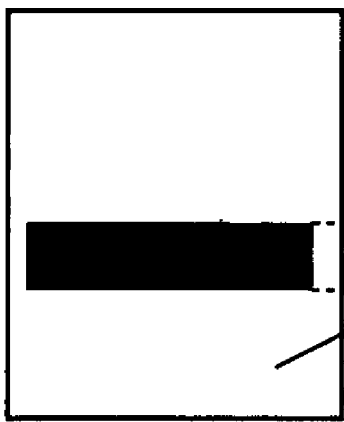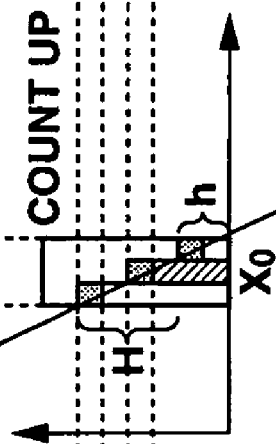
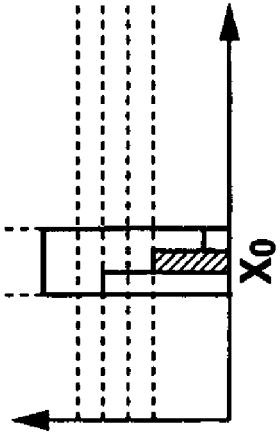
FIG.5A  FIG.5B  FIG.5C

MOTION DETECTING METHOD AND APPARATUS

CROSS-REFERENCE TO RELATED APPLICATION

This application claims priority from Japanese Patent Application Serial No. 2006-078482, filed Mar. 22, 2006, which is incorporated herein in its entirety by reference.

TECHNICAL FIELD

The present invention relates to a method and apparatus for detecting an object and motion of the object from images.

BACKGROUND

One example of a motion detecting system for detecting the moving speed and direction of an object from imagery produced by an imaging device such as camera is described in published Japanese patent application JP 2003-67752. This published patent application shows a motion detecting system mounted in a vehicle and arranged to recognize a preceding vehicle and/or an object in the periphery. This system extracts, from an electronically produced source image, an edge of a preceding vehicle having luminance varying in accord with motion of the preceding vehicle, calculates an optical flow (a vector representing motion in the image) in accordance with changes in edge position in consecutive picture frames and calculates the speed of the preceding vehicle. The optical flow can be detected by using a correlation method of determining corresponding locations among frames and determining a motion vector.

BRIEF SUMMARY OF THE INVENTION

Embodiments of a motion detection apparatus are taught herein. According to one embodiment, the motion detection apparatus comprises an imaging device and a control unit. The control unit is operable to extract a characteristic region from an image produced by the imaging device, form a modified region by modifying the characteristic region, count up to increase a first count value at a first memory address corresponding to a location inside the modified region, reset a second count value at a second memory address corresponding to a location outside the modified region, calculate a moving direction and a moving speed of the modified region based on a difference among accumulated count values for adjacent locations and calculate a position of the modified region based on count values and locations in the modified region.

According to another embodiment, the motion detection apparatus comprises, for example, imaging means for forming an image of a scene around a mounting location, characteristic region extracting means for extracting a characteristic region in the image, characteristic region modifying means for forming a modified region by modifying the characteristic region, voting means for increasing a first count value in a first memory address corresponding to a location inside the modified region and for resetting a second count value at a second memory address corresponding to a location outside the modified region, moving speed calculating means for calculating a moving direction and a moving speed of the modified region based on a difference among count values accumulated at adjacent memory addresses by the voting means and position calculating means for calculating a position of the modified region based on count values and locations in the modified region.

Methods of processing an image are also taught herein. One such method comprises, by example, extracting a characteristic region from an input image, modifying the characteristic region to form a modified region, counting to increase or decrease a first count value at a first memory address corresponding to a location inside the modified region, resetting a second count value at a second memory address corresponding to a location outside the modified region and calculating at least one of a moving direction and a moving speed of the modified region based on a difference of count values accumulated at memory addresses for two adjacent locations.

BRIEF DESCRIPTION OF THE DRAWINGS

The description herein makes reference to the accompanying drawings wherein like reference numerals refer to like parts throughout the several views, and wherein:

FIG. 2 is a block diagram showing a main portion of the motion detecting apparatus according to an embodiment of the invention;

FIGS. 4A, 4B and 4C are views collectively illustrating a region normalizing or standardizing process in an edge width normalizing or standardizing section in the motion detecting apparatus according to an embodiment of the invention wherein FIG. 4A shows a characteristic region resulting from binarization; FIG. 4B shows a characteristic region resulting from thinning; and FIG. 4C shows a characteristic region resulting from dilation;

FIGS. 5A, 5B and 5C are views collectively illustrating a voting process in a voting section and a moving speed calculating process in a moving speed detecting section in the motion detecting apparatus according to an embodiment of the invention wherein FIG. 5A shows a frame at a time point t; FIG. 5B shows a frame at a time point t+1; and FIG. 5C shows a frame at a time point t+2.

FIGS. 6A and 6B are views collectively illustrating a position calculating process for determining the position of an edge peak (the position of a center of gravity) in a position calculating section in the motion detecting apparatus according to an embodiment of the invention wherein FIG. 6A shows image information obtained by the edge extracting section; and FIG. 6B shows count values accumulated by the voting process by the voting section;

DETAILED DESCRIPTION OF EMBODIMENTS OF THE INVENTION

Figure 1A:
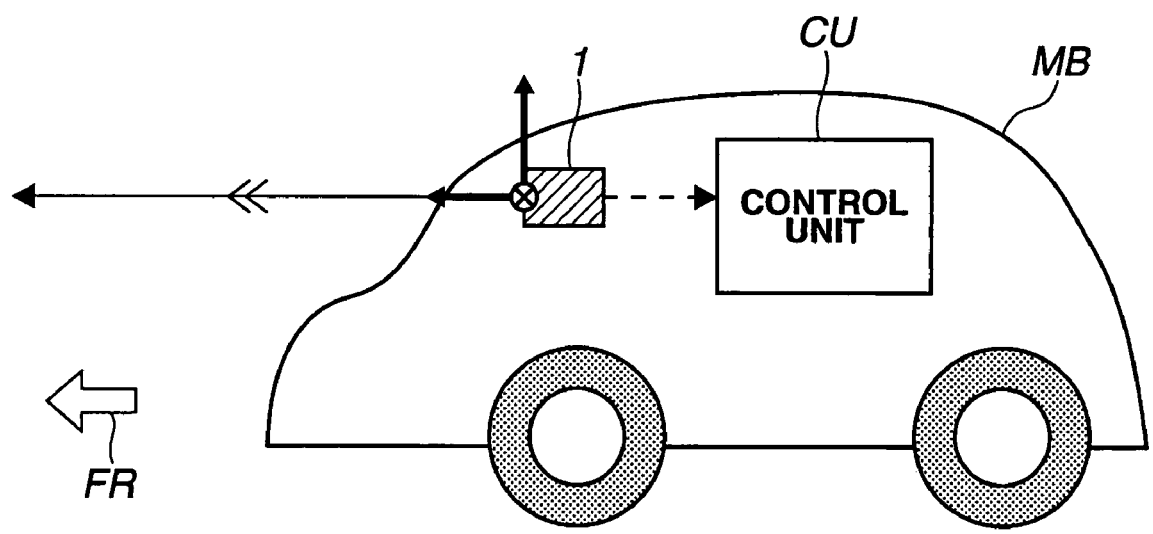
FIGS. 1A and 1B are schematic views showing a vehicle equipped with motion detecting apparatus in a first example according to an embodiment of the invention.
Figure 1B:
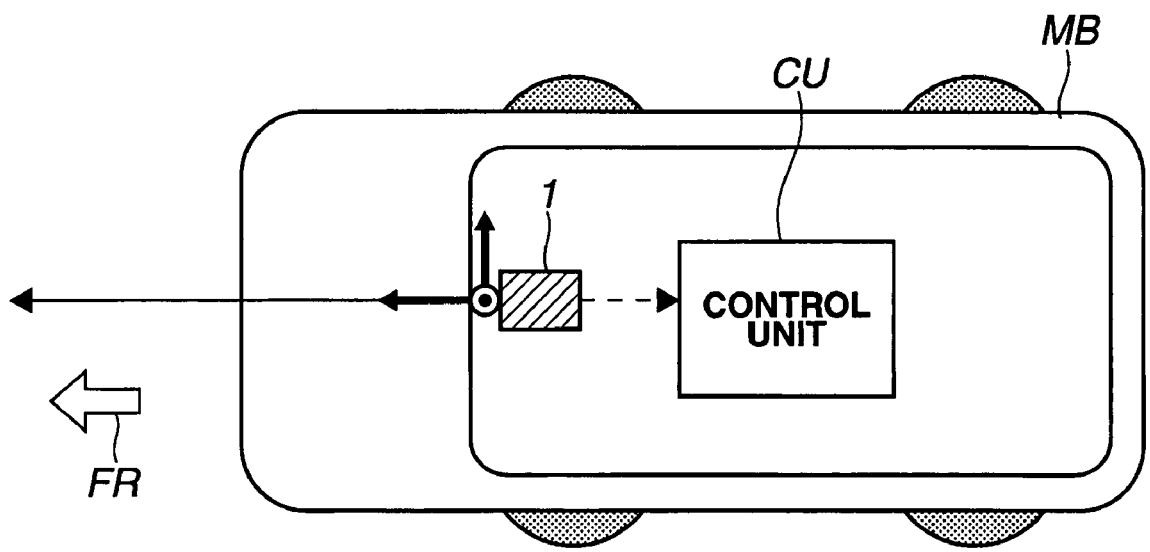

The motion detecting system for detecting moving speed and direction of an object from imagery produced by an imaging device such as camera described in a published Japanese patent application JP 2003-67752 has problems in determining optical flow. In the case of the correlation method, that system sets a region to calculate correlation values around a region of interest and requires a block matching process to calculate correlation values of luminance in the region among frames. Therefore, the amount of computation becomes very great, and the time required for the process becomes long.

The motion detecting system of Japanese patent application JP 2003-67752 uses a technique known as block matching, which uses a group of pixels smaller than or equal to a sub-pixel smaller than one pixel. The speed, direction and coordinate position are calculated by setting a registered template in the form of data of a group of pixels around a center located at a location to be noted. Then, the system calculates correlation values by shifting by a predetermined amount, complements the correlation values with a higher order curved line and estimates the motion by calculating a position providing an extremal value. Therefore, the amount of computation increases too much, and it becomes difficult to calculate the moving speed and direction and the coordinate position at high speeds.

Embodiments of the invention provide a motion detecting method and apparatus for calculating a parameter such as a speed and a coordinate position speedily with a smaller amount of calculation data. According to these embodiments, it is possible to estimate motion of an object with high speed calculation using count values without the need for computation for complementing correlation values with a high order curve.

More specifically, FIGS. 1A, 1B and 2 through 10 show a motion detection apparatus or system according to an embodiment of the present invention. The motion detection apparatus is mounted in a vehicle MB and includes an imaging device 1. In this embodiment, imaging device 1 is disposed at a position near a rearview mirror in a passenger compartment of vehicle MB. Imaging device 1 may include a camera producing luminance imagery by using an image sensor or imager such as a Charge Coupled Device (CCD) imager or a Complementary Metal Oxide Semiconductor (CMOS) imager. Imaging device 1 performs continuous operations for picking up images and taking out images in the form of frames at regular intervals.

The information obtained by imaging device 1 is input to a control unit CU. Control unit CU is a device which includes random access memory (RAM), read only memory (ROM) and a central processing unit (CPU). More specifically, control unit CU is generally a microcomputer including CPU, input and output ports (I/O), RAM, keep alive memory (KAM), a common data bus and ROM as an electronic storage medium for executable programs and certain stored values as discussed hereinafter. The various parts of the control unit CU could be, for example, implemented in software as the executable programs, or could be implemented in whole or in part by separate hardware in the form of one or more integrated circuits (IC). As described in more detail herein, control unit CU is configured to perform operations to extract an edge (or edges), as a characteristic region, from images produced by imaging device 1 and to calculate the moving direction and speed and the position of the edge (or each edge). Hereinafter, the characteristic region is referred to as an edge.

FIG. 2 is a block diagram illustrating functions performed by control unit CU. As shown in FIG. 2, control unit CU includes an edge extracting section or part 11, an edge width normalizing section or part 12, a voting section or part 13, a moving speed detecting section or part 14 and a position calculating section or part 15. Edge extracting section 11 performs an extracting process of producing, from an input image supplied from imaging device 1, an edge image composed of pixels recognized as edge pixels and pixels not recognized as edge pixels by using a Sobel filter and/or a Prewitt filter. Edge width normalizing section 12 performs a region normalizing process of normalizing an edge width of an edge in the edge image produced by edge extracting section 11. The edge width is normalized to a predetermined number of pixels. Voting section 13 performs a voting process for storing information on the number of consecutive frames contained in an interval during which the edge normalized by edge width normalizing section 12 is observed consecutively. That is, voting section 13 counts up or increments a value of a memory address corresponding to a location in the image where the normalized edge is observed on one hand and resets a value of a memory address corresponding to a location where the normalized edge is not observed. One frame is a single picture, as a unit, formed by imaging device 1. A detecting section including moving speed detecting section 14 and position calculating section 15 is configured to perform a moving speed detecting and position calculating process that calculates the moving direction, the moving speed and the position of an extracted edge in the image in accordance with values stored by voting section 13 and a gradient represented by a difference between values. The processes performed by the edge extracting section 11, edge width normalizing section 12, voting section 13 and detecting section (14, 15) are explained more in detail below.

Figure 3:
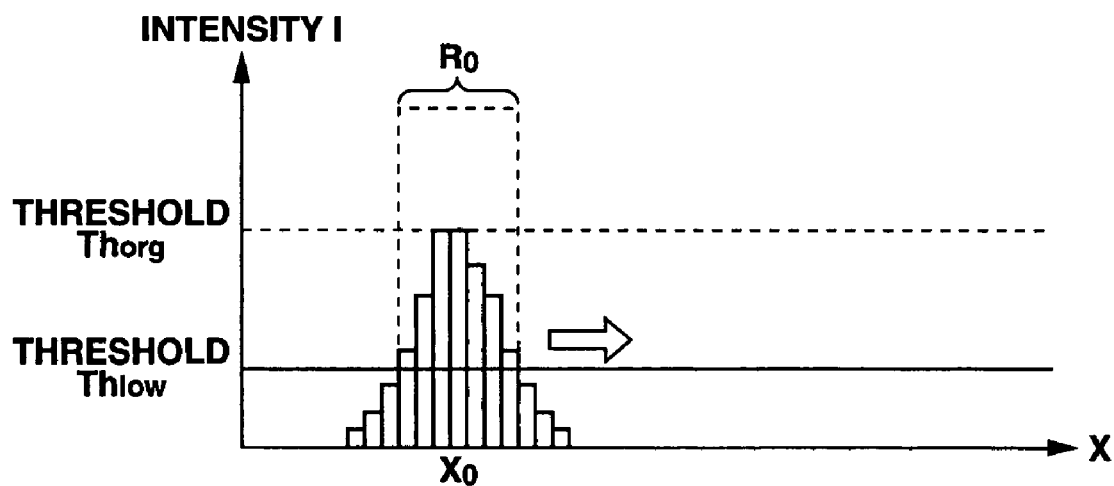
FIG. 3 is a view illustrating an edge extracting process in an edge extracting section in the motion detecting apparatus according to an embodiment of the invention.

The extracting process performed by edge extracting section 11 is a process of extracting, from information on intensity values of an edge as shown in FIG. 3, a characteristic region $R_0$ (whose speed is to be calculated) in which the intensity (or density or gray level) is higher than a threshold Thlow. This threshold Thlow is set lower than a threshold Thorg used in earlier technology. If the setting is adjusted so as to extract many edges to increase the number of regions used for speed detection, then the accuracy of the speed calculation tends to degrade because adjacent regions may overlap each other in an operation of expanding or dilating the edge width in the region normalizing process. Therefore, in order to avoid overlap of adjacent edges, the density of edges must be lowered and the threshold Thorg to discriminate an edge must be set higher. By contrast, according to this embodiment, the position of the center of gravity is used as an edge peak in the region normalizing process as mentioned hereinafter, and hence the edge extracting threshold Thlow of this example is set low (as compared to the threshold of the earlier technology) so that edges of various widths can be extracted.

Figure 4A:
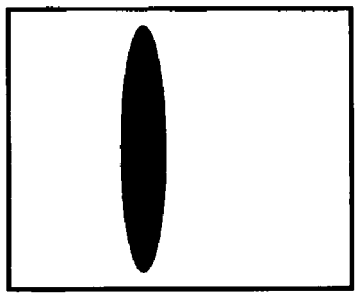
Figure 4B:
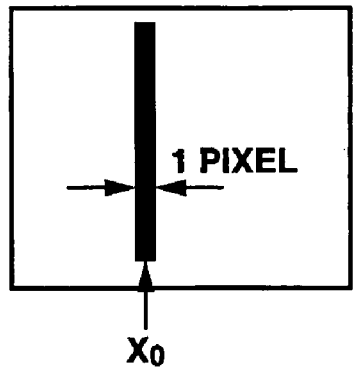
Figure 4C:
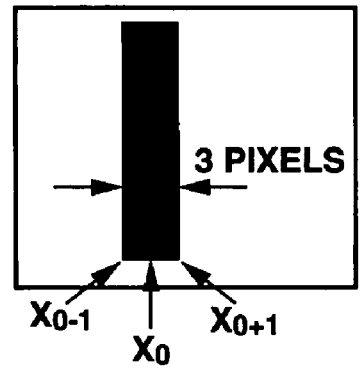

FIGS. 4A, 4B and 4C show the region normalizing process in edge width normalizing section 12. The region normalizing process is a process of detecting a characteristic position of an edge image (characteristic region $R_0$) output from edge extracting section 11 and producing a binary image having a predetermined width (of 3 pixels in the example of FIGS. 4A, 4B and 4C) centered at the characteristic position. In this embodiment the characteristic position is the position of the center of gravity of a detected edge, and this characteristic position is referred to as an edge peak hereinafter.

There exists a plurality of edges outputted from edge extracting section 11, and each edge has a width over which intensity values are distributed. Therefore, the region normalizing process in edge width normalizing section 12 includes a process of detecting the edge peak of at least one edge (that is, the position of $x=X_0$); a thinning process of decreasing the width to a width value equal to the width of one pixel, in this example at the edge peak $X_0$ as shown in FIG. 4B; and a dilating process of expanding the edge to a width of three pixels, for example, centered at the edge peak $X_0$ as shown in FIG. 4C.

The edge width normalizing section 12 first binarizes the characteristic region $R_0$ extracted by edge extracting section 11 as shown in FIG. 3 to thereby form a binary image as shown in FIG. 4A. Then, edge width normalizing section 12 determines the position of the edge peak $X_0$ by performing the gravity center calculation using edge intensity values $I(x)$ at locations (coordinate locations) x within the characteristic region $R_0$ according to the equation below:

$$X_0 = [\Sigma I(x) \cdot x]/\Sigma I(x); \text{ wherein} \quad (1)$$

$\Sigma$ denotes a summation in the range of $x \in R_0$. In this way, the edge width normalizing section 12 produces an edge of a one pixel width at the edge peak $X_0$ in the form of a thin line as shown in FIG. 4B.

In calculating the edge peak $X_0$ according to equation (1), a fractional part after the decimal point can be treated by rounding off or rounding up or rounding down. In this example, a rounding down (or cutting off) operation is employed.

The dilating or expanding process is a process of expanding an edge of a smaller width (of one pixel in this example) to a predetermined larger width of ±n, centered at the edge peak $X_0$ as shown in FIG. 4C. In this example, n=1, and the edge width is increased from one pixel to three pixels. That is, the edge width normalizing section 12 makes active pixels at a position $X_{0-1}$ on one side of the edge peak $X_0$ and at a position $X_{0+1}$ on the opposite side of the edge peak $X_0$. From the edge image delivered from edge extracting section 11, the edge width normalizing section 12 thus changes the number of pixels or the area and thereby produces a two-valued edge image having a uniform edge width (here, a three-pixel width). Additional discussion of this technique of normalization, such as the details of binarization, is omitted as various such techniques are known to those skilled in the art.

FIGS. 5A, 5B and 5C show the voting process in voting section 13. In this description of the voting process it is assumed for simplification of explanation that an edge moves linearly in a one-dimensional direction along the x axis. Moreover, a count value of a memory address corresponding to an edge location is counted up by one (increased by one), and memory addresses are so set that each corresponds uniquely to one pixel.

The voting process is based on the edge of the predetermined width (three-pixel width) produced by edge width normalizing section 12 and is designed to count up the value of the count in the memory address at each of the locations $(X_{0-1}, X_0, X_{0+1})$ where the edge is observed. The voting process also resets to zero (or clears the value of the count in the memory address) a location or each of the locations where the edge is not observed.

First, at a time point (point in time or instant) t as shown in FIG. 5A, the voting section 13 receives an edge expanded to the three pixel width from edge width normalizing section 12. The edge is located so that the center of the edge is at the position of $x=X_0$ as shown in FIG. 5A. At time point t, the voting section 13 increases by one the count value in the memory address of each of the edge locations (coordinates) $X_{0-1}, X_0$ and $X_{0+1}$ where the edge is observed.

In the embodiment shown in FIG. 5A, the count value for the location $X_{0-1}$ is increased to 5, the count value for the location $X_0$ is increased to 3, and the count value for the location $X_{0+1}$ is increased to 1. At time point t+1, the position of the edge remains unchanged. Therefore, at time point t+1, the voting section 13 increases by one the count value in the memory address of each of the edge locations $X_{0-1}, X_0$, and $X_{0+1}$ again. As shown in FIG. 5B, the count value of the memory address for the location $X_{0-1}$ is increased to 6, the count value for the location $X_0$ is increased to 4, and the count value for the location $X_{0+1}$ is increased to 2. At time point t+2 shown in FIG. 5C, the edge is shifted by one pixel in the positive direction along the x axis. In this case, the voting section 13 counts up the value in the memory address at each of the locations $X_0, X_{0+1}$ and $X_{0+2}$ where the edge is detected. The voting section 13 also reset to zero the value in the memory address at each of locations other than the locations where the edge is observed. As shown in FIG. 5C, the count value for the location $X_{0-1}$ is decreased or reset to zero, the count value for the location $X_0$ is increased to 5, the count value for the location $X_{0+1}$ is increased to 3, and the count value for the location $X_{0+2}$ is increased to 1. The count values for the other locations including location $X_{0-1}$ are reset to zero.

In the moving speed detecting process, the moving speed detecting section 14 calculates a slope of the count values in the moving direction by using the count values for the predetermined number of pixels (which is three in this example) counted by voting section 13 as shown in FIG. 5C and determines the moving speed of the edge by using the relationship that the slope is equal to the reciprocal of the moving speed. When the frame rate is sufficiently high as compared to the moving speed of a characteristic region (edge), overlapped portions are formed among edges observed in consecutive frames. For example, in the case of FIGS. 5A, 5B and 5C, the edge in the frame of time point t+1 and the edge in the frame of time point t+2 overlap each other over a two-pixel width. In this example, the dynamics of an object to be detected is assumed to be approximately 100 Hz, and the frame rate is set equal to 1000 fps.

Thus, the count value reached by the counting operation for the memory address corresponding to each x-coordinate location is equivalent to a time duration during which an edge is observed at the same location. When an edge moves, the count value for a new edge location at which the edge is newly observed becomes equal to one, that is, the minimum among the count values of edge locations. Thus, the count value in the moving direction becomes small and the count value in the opposite direction opposite to the moving direction becomes great. Therefore, a difference among count values or a gradient of count values is a quantity representing the number of frames in which an edge is observed consecutively at the same location. From this gradient of count values, it is possible to calculate the moving speed of an edge.

In the embodiment shown in FIGS. 5A, 5B and 5C, the count values of the memory addresses for locations (coordinates) $X_{0-1}, X_0, X_{0+1}$ are 6, 4 and 2, respectively, at time point t+1. This set or distribution of the count values indicates that the edge has been observed in four consecutive frames (6−2=4 frames) at locations (coordinates) $X_{0-2}, X_{0-1}$ and $X_0$ before the edge is observed at locations $X_{0-1}, X_0$ and $X_{0+1}$. Consequently, it is possible to judge that the edge of interest is moving by one pixel in four frames. Moreover, the count value of location $X_{0+1}$ (count value=2) indicates that the edge is observed at locations $X_{0-1}$, $X_0$ and $X_{0+1}$ in two consecutive frames.

In the embodiment shown in FIGS. 5A, 5B and 5C, the edge moves at the rate of one pixel in an interval of four consecutive frames, and the edge is observed in two consecutive frames at time point t+1. Therefore, it is possible to judge that, at time point t+1, the edge is shifted from the location $X_0$ by 0.5 pixel. That is, 2 frames/{four frames/one pixel}=0.5 pixel. In this way, moving speed detecting section 14 can determine the moving speed of an object from the gradient of count values of an edge of the object in an input image. Furthermore, moving speed detecting section 14 can determine the acceleration of the object from the moving speed of the object.

Position calculating section 15 performs a position calculating process of calculating the position of an edge in the following manner. The position calculating process in this example is a process of using the locations $X_{0-1}$, $X_0$ and $X_{0+1}$ where the edge is observed in the examples of FIGS. 5A, 5B and 5C as a process region S and calculating the edge peak position (characteristic position) xedge from a gravity center position (average value) obtained by dividing a summation $(\Sigma C(x) \cdot x)$ of products each obtained by multiplying the coordinate value of each location in process region S by the count value $C(x)$ as a weight, by a summation $(\Sigma C(x))$ of the count values $C(x)$ of the locations in process region S. That is:

$$x\text{edge}=[\Sigma C(x) \cdot x]/\Sigma C(x); \text{ wherein} \quad (2)$$

$\Sigma$ denote a summation in the range of $x \in S$.

Figure 6A:
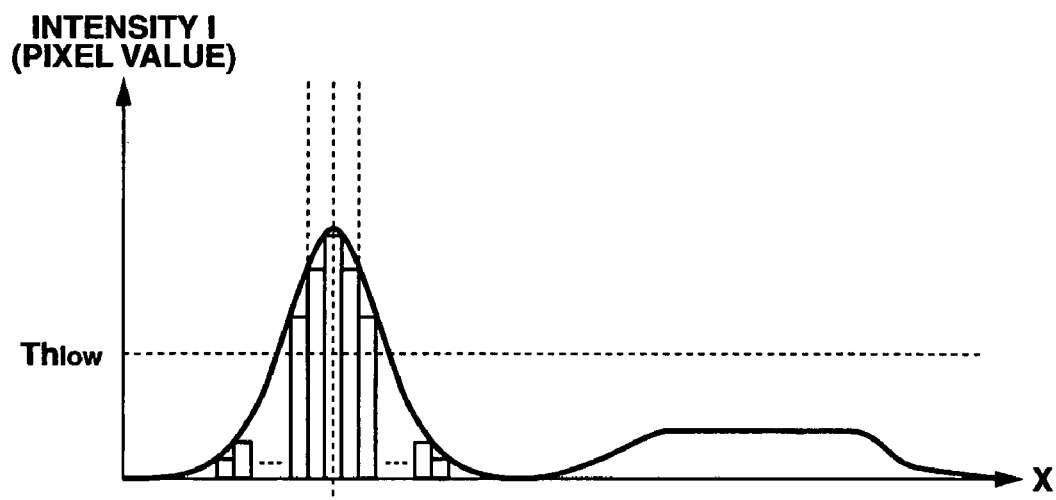
Figure 6B:
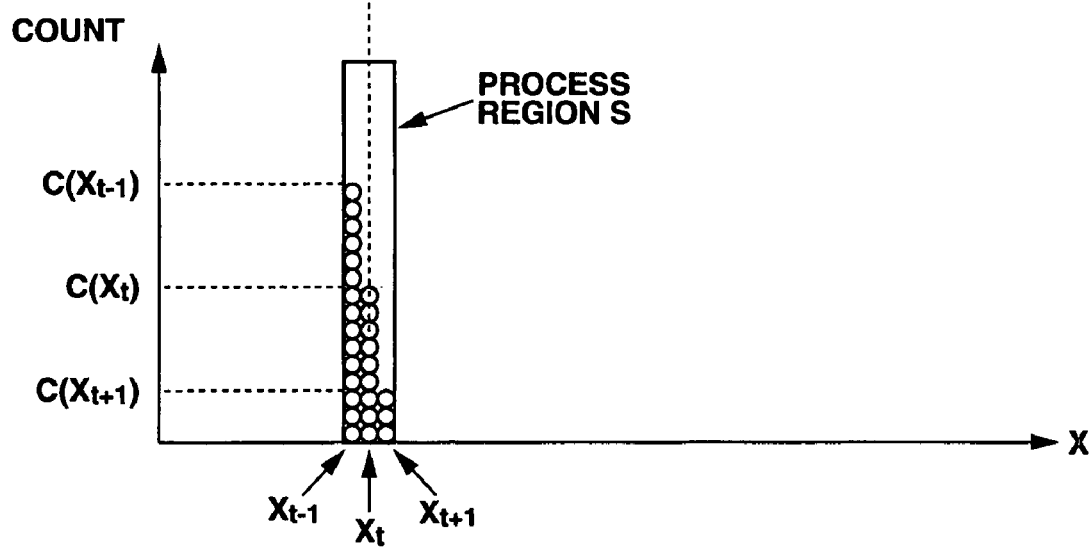

FIGS. 6A and 6B are graphs for explaining one example of the position calculating process. In this example, at three pixel locations $X_{t-1}$, $X_t$ and $X_{t+1}$ in the process region S in which an edge is observed at a time point t, the count values are $C(X_{t-1})=15$, $C(X_t)=9$ and $C(X_{t+1})=3$. Therefore, in this example:

$$\Sigma C(x) \cdot x = 15(X_{t-1}) + 9(X_t) + 3(X_{t+1});$$

$$\Sigma C(x) = 15+9+3=27;$$

$$X_{t-1}=X_t-1; \text{ and}$$

$$X_{t+1}=X_t+1.$$

Therefore, $x\text{edge}=X_t-(12/27)$.

The final edge position xedge can be determined by rounding the thus-determined edge position by one of rounding-off, rounding-up and rounding-down. This example employs the rounding-down operation, and the edge peak position xedge is equal to $X_t$, that is, $x\text{edge}=X_t$.

Thus, section including moving speed detecting section 14 and position calculating section 15 is adapted to deliver the moving direction, the moving speed and the edge peak position to an external device such as a vehicular drive assisting system.

Figure 7:
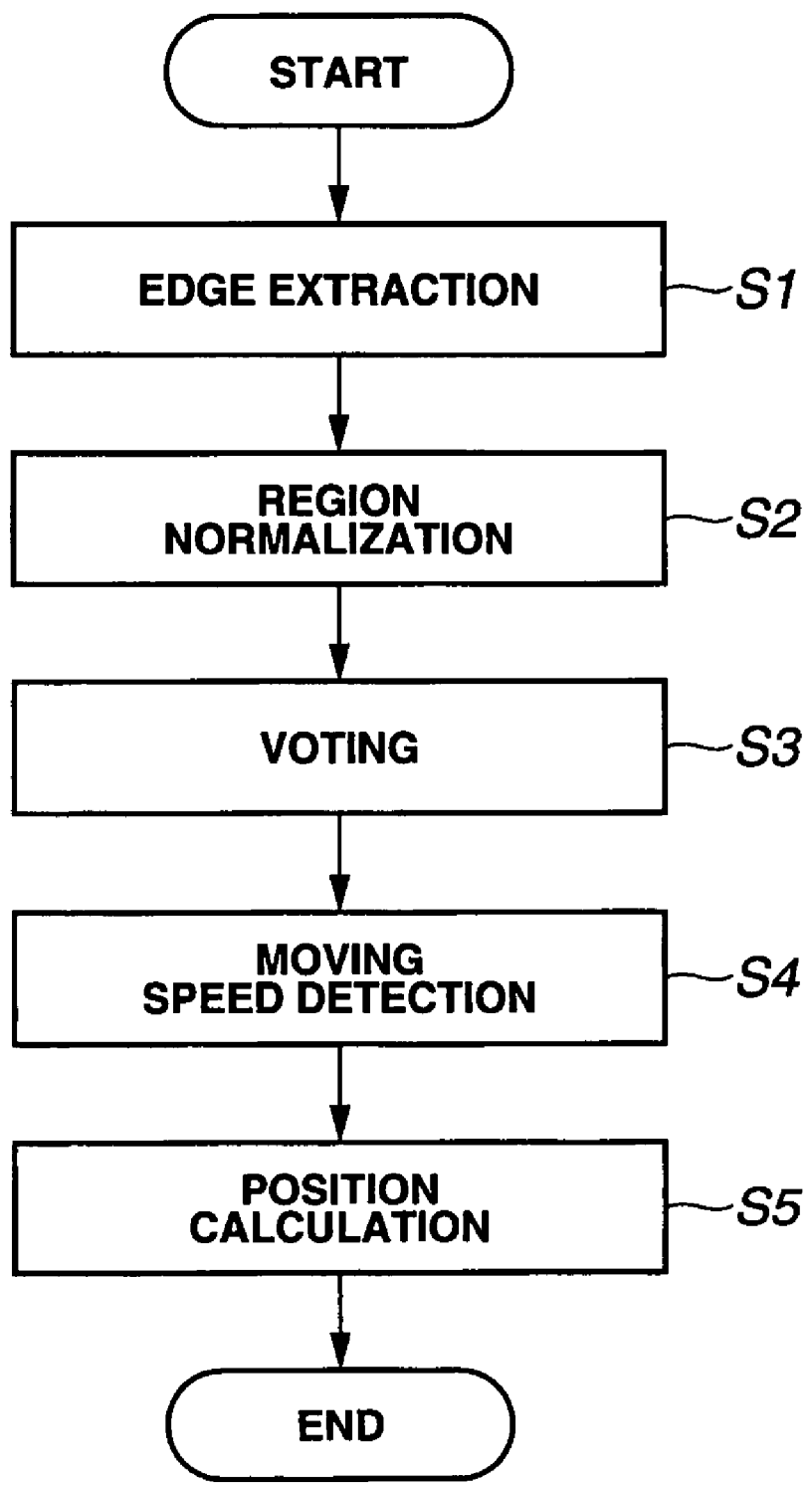
FIG. 7 is a flowchart showing a motion detecting process in an example according to an embodiment of the invention.

FIG. 7 is a flowchart showing an embodiment of the invention including the process performed by control unit CU to determine the moving speed and position. Step S1 is the edge extracting process. At step S1 the edge extracting section 11 of control unit CU extracts an edge of pixels having intensity values higher than or equal to threshold Thlow as shown in FIG. 3.

Step S2 is the region normalizing process. At step S2 the edge width normalizing section 12 of control unit CU performs the thinning process on the edge extracted at step S1. In the thinning process, the edge is processed to a thin region of one pixel width at an edge peak position $X_0$ by performing the gravity center calculation with the edge intensity I(x) as shown in FIG. 4B. Furthermore, the edge width normalizing section 12 of control unit CU performs the dilating process and defines an edge having a predetermined width (that is, the three pixel width in this example) and the center located at the edge peak position $X_0$.

Step S3 is the voting process. At step S3 the voting section 13 of control unit CU gives a vote of "+1" (counts up) to the value of the memory address for each location (x coordinate) in the process region S determined at S2 and resets to zero the value of the memory address for each location (x coordinate) outside the process region S. This step is shown in FIGS. 5A, 5B and 5C.

Step S4 is the moving speed calculating process. At step S4, the moving speed detecting section 14 of control unit CU determines the moving direction and moving speed of the edge in accordance with a difference (gradient) in a set of the count values (for three pixels in this example) counted by the voting process of step S3.

Step S5 is the calculating process for calculating the edge peak position (characteristic position) xedge. At step S5 the position calculating section 15 of control unit CU calculates the quotient by dividing a dividend by a divisor and sets the quotient as the coordinate of the gravity center position, or edge peak position xedge. The dividend (or numerator) is the summation of products $C(x) \cdot x$ for the locations in process region S. Each of the products is obtained by multiplication between the x coordinate of one location in the process region S and the count value of that location as the weight of the location. The divisor (or denominator) is the summation of the count values of the locations in the process region S.

A motion detection system or apparatus constructed in accordance with an embodiment of the invention is thus operated as described below.

Figure 8A:
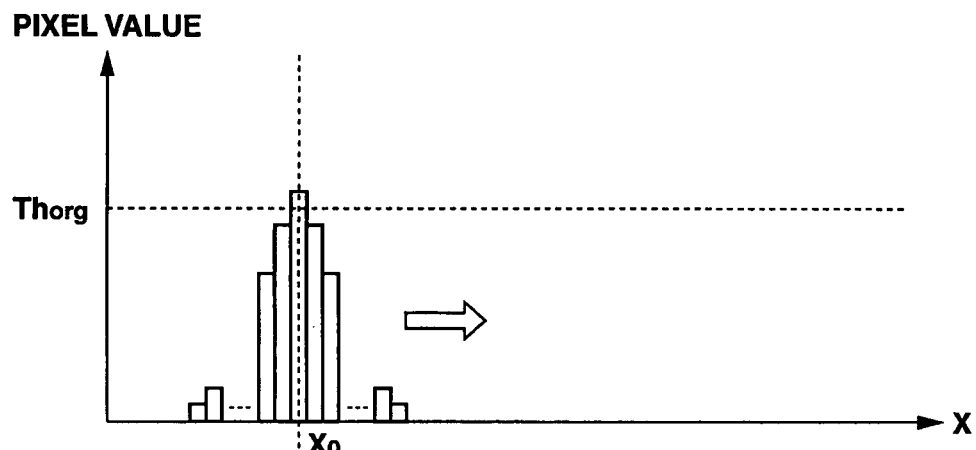
FIGS. 8A and 8B are graphs illustrating vanishing of an edge in a comparative example for comparison with the invention taught herein.
Figure 8B:
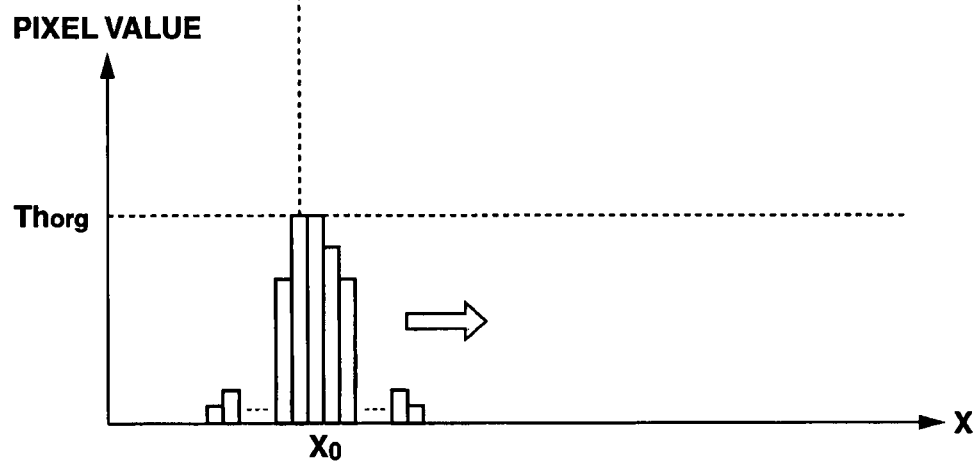

As mentioned before, the threshold Thorg to discriminate an edge is set relatively high in earlier technology. When the threshold is set at such a high level, the edge location might wobble or become unsteady. In the earlier technology, the threshold is generally determined in accordance with the level of noise superposed on imagery. With the threshold set sufficiently higher than the noise level, the system can detect edges in a relatively stable manner. However, when the threshold Thorg is sufficiently high as compared to the noise level, the detection becomes difficult for edges of low contrast. Also, edges tend to become unsteady for the following reasons. As shown in FIGS. 8A and 8B, when threshold Thorg is relatively high, the intensity I might become lower than threshold Thorg, and an edge might vanish during a transition of an edge among pixels.

Figure 9A:
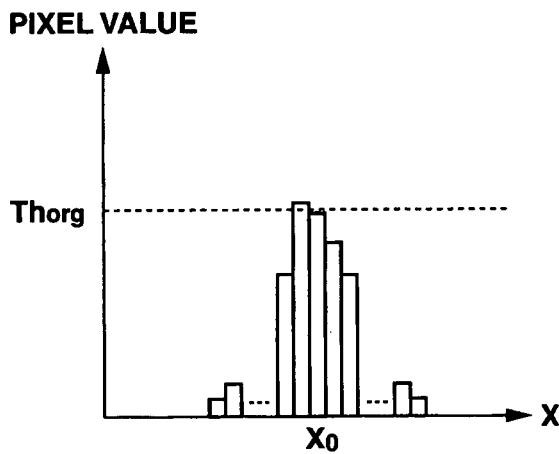
FIGS. 9A and 9B are graphs illustrating unsteadiness of an edge in the comparative example for comparison with the invention taught herein.
Figure 9B:
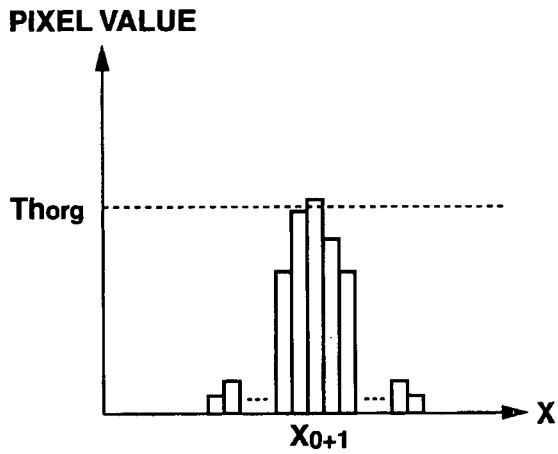

Alternatively, if during the process of transfer of image data from an imaging device to a control unit, the intensity (or density) I is increased by the superposition of a noise such as a switching noise and thermal noise. Hence, the system might conclude that an edge exists at the position where the intensity (density) I is increased beyond the threshold. Since noises are produced at random, noises may be superposed at various locations. If noises are superposed at the location $X_0$ where an edge is detected and the adjacent location $X_{0+1}$ adjacent to $X_0$ during movement of an edge in the positive direction of the x axis, edges might be observed randomly frame after frame at locations $X_0$ and $X_{0+1}$ as shown in FIGS. 9A and 9B.

In this way, edges may vanish or may be observed randomly, and edges may wobble or become unsteady. If an edge vanishes, the accumulated count values are reset to zero, and the detection system restarts the voting operation when an edge is detected again and measures the speed after count values are accumulated to a predetermined level. Therefore, as to edges having an intensity value near the threshold, the measurement of speed may become difficult or inaccurate. Moreover, the region capable of being used for the speed measurement is narrowed because of the formation of a portion where the speed measurement is infeasible.

By contrast to this, a motion detection system according to an embodiment of the invention can employ the threshold Thlow set to a lower level than the threshold Thorg and extract an edge of a wider characteristic region $R_0$. Therefore, a motion detection system according to an embodiment of the invention can avoid vanishing and random detection of edges and prevent wobbling of edges. Moreover, a motion detection system according to an embodiment of the invention is arranged to calculate the position of the center of gravity of the characteristic region $R_0$ in decreasing the edge width in edge width normalizing section 12. Therefore, a motion detection system according to an embodiment of the invention can calculate the edge peak of the characteristic region $R_0$ accurately even if noise is superposed on the edge, can calculate the moving speed accurately, and can increase the region in which the speed detection is feasible. Moreover, the position calculating section 15 calculates the edge peak position xedge by using count values determined by the voting process of voting section 13. Therefore, the system can calculate the edge peak position xedge accurately even though the edge width is set to a predetermined width of $\pm n$ (n=1 in the illustrated example) by the edge width normalizing section 12.

To facilitate understanding this effect, explanation follows on the meaning of count values or values of the count.

The first is staying time. At a location where an edge is observed, the count value is increased by a predetermined number (+1 in this example) for each frame in which the edge is observed at the location. At a location where no edge is observed, the count value is reset to zero. When this operation is repeated at regular time intervals, a difference of count values (gradient) represents a time duration of the existence or "stay" of the edge at the pixel location. The plus or minus sign of the gradient of count values represents the direction of movement of the edge.

The second is certainty of edge (or reliability). The count value increases with the passage of time or in proportion to the elapsed time at a memory address corresponding to a location of an edge observed steadily in consecutive frames. On the other hand, the count value does not increase with the passage of time at a memory address corresponding to a location of an edge where a temporary noise is observed. As to an edge, noise such as a shot noise appears only in one frame of a series of frames. For example, the count value for such an edge varies discretely or scatteringly. Thus, the count represents the certainty of existence of an edge during a predetermined period.

A profile (or the magnitude of a slope) of values of the count differs dependent on the moving speed of an edge. Whether the moving speed is high or low, the count invariably means the certainty. The count value becomes low at a location where an edge is observed because of a temporary noise, and the count value becomes high at a location where a significant edge is observed.

In FIGS. 6A and 6B, when the count value $C(X_{t-1})$ at the memory address of the location $X_{t-1}$ is high, the possibility of existence of an edge at location $X_{t-1}$ is high. In the range of the uniformized edge width, a location having a greater count value has a higher reliability to be an edge position, and a location having a smaller count value has a possibility of an edge temporarily produced by a noise. The possibility of the existence of an edge of interest is high at a location where the count value is high, and the possibility of the existence of the edge of interest is low at a location wherein the count value is low. Thus, the count value represents the reliability as to whether a significant edge does exist or not.

Therefore, the system can calculate an edge position likely enough to be a position of an edge by calculating the summation or sum of products obtained by multiplication of each location in the normalized edge width by its count value and determining a gravity center position (average value) by dividing the summation of the products by the summation or sum of the count values. The edge position thus calculated from the summation using the count values as weights is located within the process region S of a width of a predetermined number of pixels (three pixel width in the illustrated example) even if an error is involved. Therefore, the error, if any, has a magnitude of a half of the edge width (edge width/ 2). That is, the greatest value Errmax of error is equal to the edge width divided by two. In the example in which the edge width is normalized or uniformized to a three pixel width, Errmax is equal to 1.5 pixels. In this way, it is possible to decrease the magnitude of error to a very small value.

As explained above, the motion detection system according to an embodiment of the invention is arranged to extract an edge (characteristic region), to determine count values in a normalized or standardized range by a counting up operation and to calculate the moving direction, the moving speed and/ or the position. The system can detect motion by performing simplified operations at high speeds with a smaller amount of data. Moreover, the system can determine the position of an edge peak (characteristic position) with high accuracy of a sub-pixel rate smaller than one pixel rate.

Figure 10A:
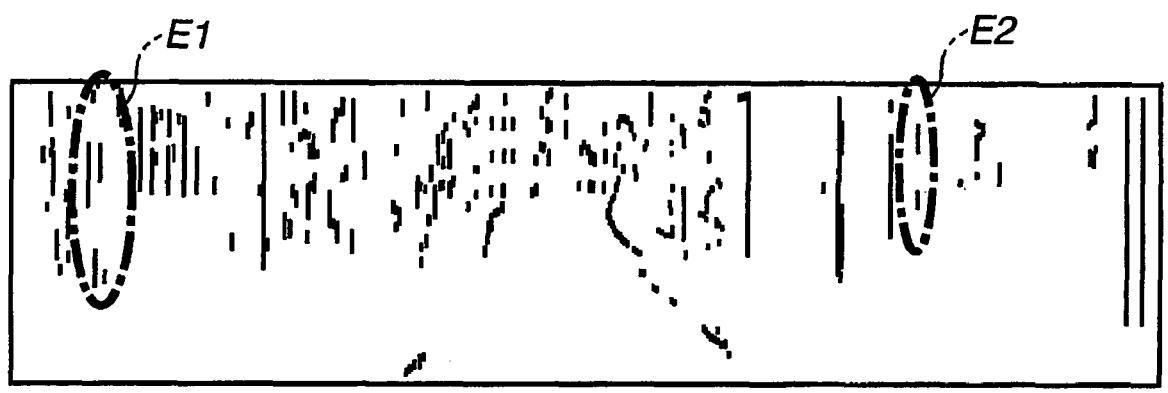
FIGS. 10A and 10B are views respectively illustrating the result of calculation in the comparative example and the result of calculation by the invention taught herein.
Figure 10B:
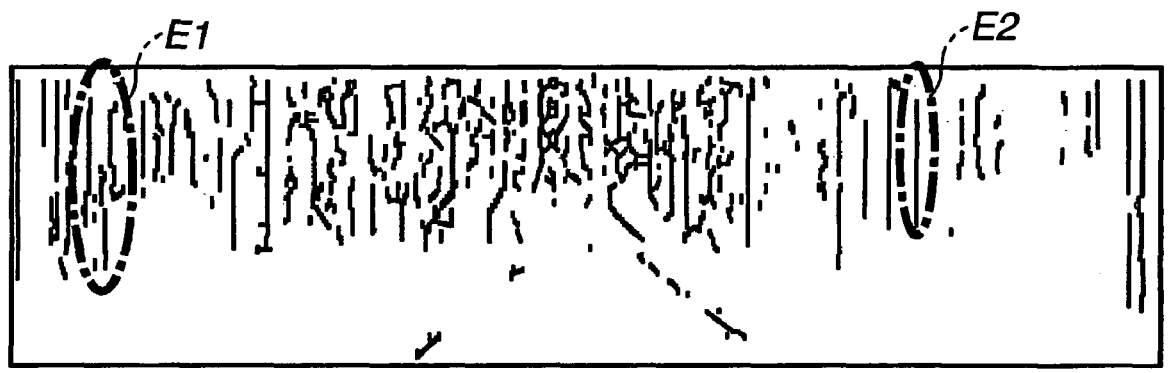

FIG. 10A shows edges detected by using the threshold Thorg of a conventional motion detection system, and FIG. 10B shows edges detected by using the threshold Thlow of a motion detection system taught herein. As evident from a comparison of these figures, the number of detected portions of edges is increased in the case of the motion detection system according to an embodiment of the invention, especially in portions denoted by E1 and E2.

Figure 11:
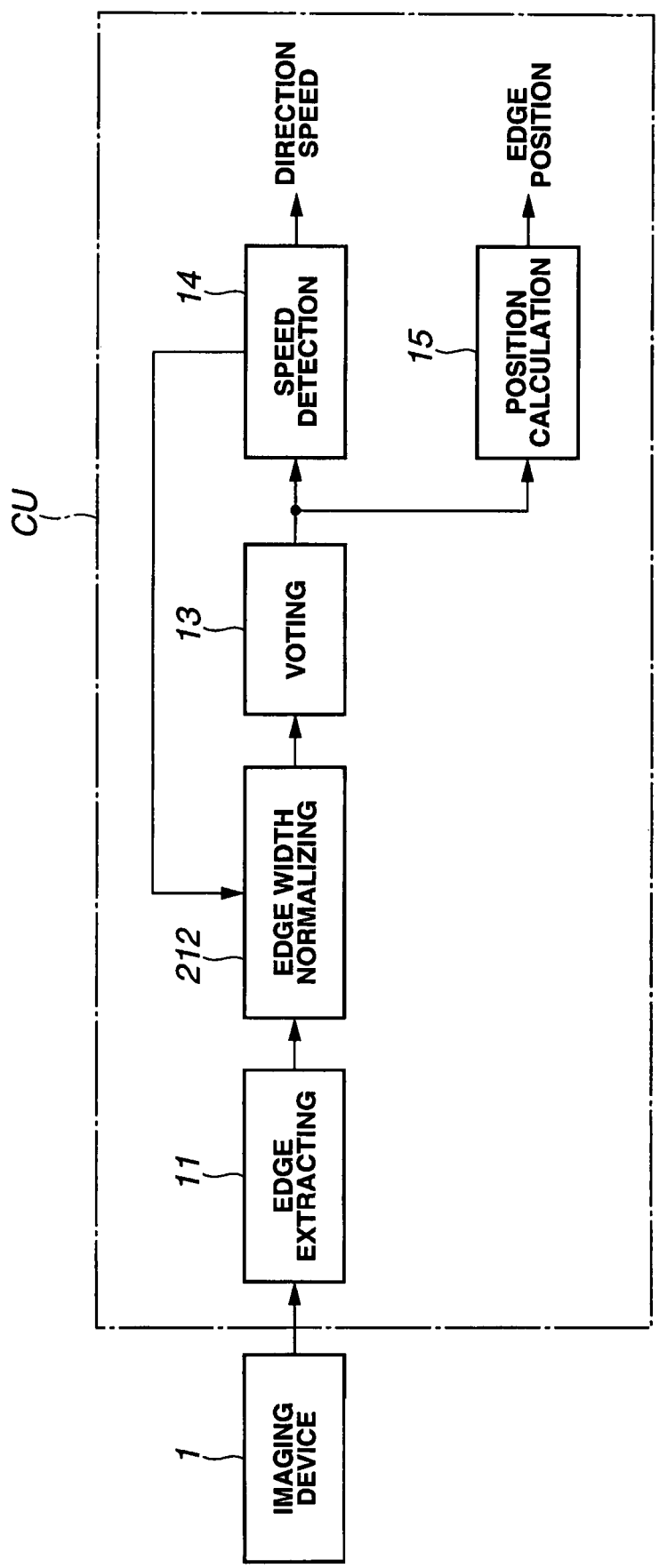
FIG. 11 is a block diagram showing a main portion of a motion detecting apparatus according to another embodiment of the invention.

FIG. 11 shows a motion detecting apparatus according to another embodiment of the invention. The motion detection system of FIG. 11 is almost the same as the system shown in FIG. 2. The following explanation is mainly directed to portions different between the systems of FIG. 11 and FIG. 2, and repetitive explanation is omitted for portions that are substantially identical.

An edge width normalizing section 212 shown in FIG. 11 is arranged to receive the moving speed calculated by the moving speed detecting section 14 and to adjust the edge width or the number n to which the width of a region is expanded or dilated in the dilating process of FIG. 4C in accordance with the moving speed. In the dilating or expanding process, a thinned edge region of a smaller width (of one pixel in this example) is expanded to an edge region having a predetermined larger width of $\pm n$ and having a center located at the edge peak position $X_0$ as shown in FIG. 4C. The system of the second embodiment varies the number n for determining the edge width dependent on the detected moving speed. The number n is increased to a number equal to or greater than 2 when the moving speed is high.

Thus, the motion detection system of this embodiment increases the edge width as the moving speed becomes higher so that regions of an edge of an object always overlap in consecutive frames. Therefore, the system of this embodiment can count for two or more frames consecutively because an edge is observed reliably at the same location consecutively in two or more frames, thereby to improve the accuracy in detection of the moving speed. This makes it possible to improve the accuracy of the detection even if the moving speed increases and to expand the range in which the detection of the moving speed is feasible.

Although the invention has been described above with reference to the examples above, the invention is not limited to these embodiments. Modifications and variations are within the purview of the invention. For example, although the motion detection system in each of the first and second examples is adapted to be used for a vehicle such as motor vehicle, the invention can be used in various other applications such as ship and vessel, aircraft, robot and other apparatuses for observation.

In the embodiments described above the dynamics of an object to be detected is assumed to be 100 Hz, and the frame rate is set at 1000 fps. However, the frame rate is not limited to this value and may be set to various values. It is preferable, but not necessary, to set the frame rate at a value sufficiently high as compared to the dynamics of an object to be detected.

In the embodiments described above an edge is moved in a horizontal direction. However, the moving direction of an edge is not limited to the horizontal direction. For example, it is possible to calculate the moving speed in the same manner when the moving direction is an up-and-down (or a vertical direction) or a direction intermediate between the horizontal and vertical directions.

In the embodiments described above the peak of an edge is regarded as the characteristic position. However, the invention is not limited to this. The characteristic position may be a position of a peak value of a variable represented by image information. In the case of source information supplied from an infrared camera, for example, it is possible to treat a position of a peak value of the temperature as the characteristic position. Alternatively, it is possible to treat a position of a peak value of a variable representing a predetermined color as the characteristic position.

The motion detection system taught herein thus extracts an edge corresponding to an object to be detected, forms a modified region by modifying an extracted edge region into a uniform shape, determines a count value in each location in the modified region so that the count value of that location represents a number of consecutive frames in which an edge is observed at that location and calculates a parameter representing motion of the object in accordance with the count values in the modified region. The parameter may include at least one of the moving direction, the moving speed and the position of the object at a predetermined instant. In each of consecutive frames or images, the count value for one location may be incremented if an edge is observed at that location and reset if the edge is not observed at that location.

As mentioned, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A motion detection apparatus, comprising:
   an imaging device; and
   a control unit operable to:
   extract a characteristic region from an image produced by the imaging device;
   form a modified region by modifying the characteristic region;
   count up to increase a first count value at a first memory address corresponding to a location inside the modified region;
   reset a second count value at a second memory address corresponding to a location outside the modified regions; and
   calculate a position of the modified region based on count values and locations in the modified region by dividing a summation of products, each of the products obtained by multiplying each location in the modified region by a corresponding count value, by a summation of the corresponding count values of the locations in the modified region.

2. The apparatus according to claim 1 wherein the control unit is further operable to extract the characteristic region from the image produced by the imaging device by extracting a region in which an image density is higher than a predetermined threshold.

3. The apparatus according to claim 2 wherein the predetermined threshold is lower than a noise level of noise superposed on the image produced by the imaging device.

4. The apparatus according to claim 1 wherein the control unit is further operable to modify the characteristic region by calculating a gravity center position of the characteristic region and forming the modified region spreading in a range of pixels around the gravity center position as a center.

5. The apparatus according to claim 1 wherein the control unit is further operable to modify the characteristic region by modifying the characteristic region based on a speed of an object whose speed is to be detected.

6. The apparatus according to claim 1 wherein the controller is further operable to:
   receive images produced by the imaging device in a form of consecutive frames; and wherein a frame rate of the consecutive frames is based on an assumed moving speed of an object to be detected on the images.

7. The apparatus according to claim 1, further comprising:
   calculate a moving direction and a moving speed of the modified region based on a difference among accumulated count values for adjacent locations.

8. A motion detection apparatus, comprising:
   imaging means for forming an image of a scene around a mounting location;
   characteristic region extracting means for extracting a characteristic region in the image;
   characteristic region modifying means for forming a modified region by modifying the characteristic region, wherein the characteristic region modifying means includes:
   means for calculating a gravity center position of the characteristic region by multiplying edge intensity values of pixels with the characteristic region by their respective coordinate locations to obtain a respective product, summing each respective product together to obtain a summation of products, summing the edge intensity values of the pixels within the characteristic region to obtain a summation of intensity values and dividing the summation of products by the summation of intensity values to obtain the gravity center position; and
   means for forming the modified region using a range of pixels around the gravity center position;
   voting means for increasing a first count value in a first memory address corresponding to a location inside the modified region and for resetting a second count value at a second memory address corresponding to a location outside the modified region; and position calculating means for calculating a position of the modified region based on count values and locations in the modified region.

9. The apparatus according to claim 8 wherein the mounting location is a vehicle.

10. The apparatus according to claim 8 wherein the position calculating means comprises:
means for multiplying each location in the modified region by a corresponding count value to obtain a respective product;
means for summing each of the respective products together to obtain a summation of products;
means for summing the corresponding count values of the locations in the modified region to obtain a summation of count values; and
means for dividing the summation of products by the summation of count values to obtain the position.

11. The apparatus according to claim 10, further comprising:
moving speed calculating means for calculating a moving direction and a moving speed of the modified region based on a difference among count values accumulated at adjacent memory addresses by the voting means.

12. A motion detection method, comprising:
extracting a characteristic region from an input image;
modifying the characteristic region to form a modified region;
counting to increase or decrease a first count value at a first memory address corresponding to a location inside the modified region;
resetting a second count value at a second memory address corresponding to a location outside the modified region;
calculating at least one of a moving direction and a moving speed of the modified region based on a difference of count values accumulated at memory addresses for at least two adjacent locations; and
calculating a position of the modified region based on locations in the modified region and respective count values at the memory addresses by:
multiplying each location in the modified region by a corresponding count value to obtain a respective product;
summing each of the respective products together to obtain a summation of products;
summing the corresponding count values of the locations in the modified region to obtain a summation of count values; and
dividing the summation of products by the summation of count values to obtain the position.

13. The method according to claim 12 wherein extracting the characteristic region from the input image further comprises:
extracting a region in which an image density is higher than a predetermined threshold, the region defining the characteristic region.

14. The method according to claim 13 wherein modifying the characteristic region to form a modified region further comprises:
calculating a gravity center position of the characteristic region; and
forming the modified region using a range of pixels around the gravity center position.

15. The method according to claim 14, further comprising:
providing feedback from the moving speed of the modified region; and
modifying the characteristic region based on the moving speed.

16. The method according to claim 14, wherein calculating the gravity center position of the characteristic region comprises:
multiplying edge intensity values of pixels with the characteristic region by their respective coordinate locations to obtain a respective product;
summing each respective product together to obtain a summation of products;
summing the edge intensity values of the pixels within the characteristic region to obtain a summation of intensity values; and
dividing the summation of products by the summation of intensity values to obtain the gravity center position.

17. The method according to claim 12, further comprising:
producing the input image using an imaging device; and
setting the predetermined threshold lower than a noise level of noise superposed on the input image by the imaging device.

18. The method according to claim 12 wherein modifying the characteristic region to form a modified region further comprises:
calculating a gravity center position of the characteristic region; and
forming the modified region using a range of a plurality of pixels around the gravity center position.

19. The method according to claim 12, further comprising:
modifying the characteristic region based on a speed of an object whose speed is to be detected.

20. The method according to claim 19, further comprising:
receiving the input image as consecutive frames; and
setting a frame rate of the consecutive frames based on an assumed moving speed of the object whose speed is to be detected.

21. The method according to claim 12, further comprising:
receiving the input images as a series of consecutive frames; and wherein extracting the characteristic region from the input image includes extracting a characteristic region from each of the series of consecutive frames.

* * * * *